US005895680A

United States Patent [19]

Cirigliano et al.

[11] Patent Number: 5,895,680
[45] Date of Patent: Apr. 20, 1999

[54] FOODSTUFF PRESERVATION

[75] Inventors: Michael Charles Cirigliano, Cresskill, N.J.; Michele Alice Buchanan, Montgomery, N.Y.

[73] Assignee: Thomas J. Lipton, Englewood Cliffs, N.J.

[21] Appl. No.: 08/770,966

[22] Filed: Dec. 20, 1996

Related U.S. Application Data

[60] Provisional application No. 60/020,282, Jun. 19, 1996.

[51] Int. Cl.$^6$ ........................................... A23L 3/34
[52] U.S. Cl. ............................... 426/326; 426/321
[58] Field of Search ........................ 426/326, 32, 42, 426/53, 61, 321

[56] References Cited

U.S. PATENT DOCUMENTS

| 4,600,706 | 7/1986 | Carter | 514/31 |
| 4,664,861 | 5/1987 | Pritikin et al. | 264/173 |
| 5,196,344 | 3/1993 | Ruttan | 436/18 |
| 5,573,797 | 11/1996 | Wilhoit | 426/326 |
| 5,573,800 | 11/1996 | Wilhoit | 426/326 |
| 5,573,801 | 11/1996 | Wilhoit | 426/326 |

OTHER PUBLICATIONS

Federal Register (Jun. 22, 1982) p. 26823–26824.
Technical Bulletin on Delvocid, Gist-Brocades BSD B.V. Charlotte, N.C.
J. Giese, Antimicrobials: Assuring Food Safety, Food Technology, 48 (6), Jun. 1994, pp. 101–110.
Morris and Hart, Pimaricin—What is it?, Culture Dairy Products Journal, vol. 13, pp. 22, 1987.

*Primary Examiner*—Carolyn Paden
*Attorney, Agent, or Firm*—James J. Farrell

[57] ABSTRACT

A natural microbiocidal and/or microbiostatic combination of Natamycin and Nisin is disclosed which synergistically inhibits or destroys bacteria, yeast and mold in foodstuffs.

26 Claims, No Drawings

FOODSTUFF PRESERVATION

CROSS-REFERENCE TO RELATED APPLICATION

This application claims the benefit of U.S. Provisional Application Ser. No. 60/020,282, filed Jun. 19, 1996.

BACKGROUND OF THE INVENTION

1. Field of the Invention

The present invention relates to the use of a combination of natural preservatives such as Natamycin together with Nisin in foodstuffs such as beverages, including beverages which contain tea solids, meats, dressings, sauces, marinades, condiments, spreads, margarine, dairy based foods and the like. The foodstuffs under some conditions are subject to microbial spoilage.

"Food preservation", as that term is used herein, includes methods which guard against food poisoning as well as methods which delay or prevent food spoilage due to microbes. Food preservation keeps food safe for consumption and inhibits or prevents nutrient deterioration or organoleptic changes causing food to become less palatable.

"Food spoilage", as that term is used herein, includes any alteration in the condition of food which makes it less palatable including changes in taste, smell, texture or appearance. Spoiled food may or may not be toxic.

Prevention of food spoilage has been attempted throughout history often through trial and error. The early attempts have resulted in the adoption of such food preservation methods as the drying, salting and/or smoking of foods in order to preserve them. It has been relatively recent in recorded history that food preservation has been placed upon a scientific foundation.

Present food technologists utilize an array of physical, chemical, and biological processes and agents to preserve food and prevent the transmission of disease via foodstuffs. Many chemical agents exist. These agents include antioxidants to prevent chemical degradation of food, as well as compositions which kill or inhibit deleterious bacteria and/or other microbes thereby preserving food i.e. preventing both spoilage and the transmission of disease.

Of rising concern in the food processing industry is yeast, mold and bacterial spoilage of various foods such as wieners, other sausages, cheese, dairy products including novelty ice cream, beverages, dressings, spreads, margarine and seafood. Of particular concern is evidence that pasteurized and fully cooked processed foods are being contaminated with microbes following cooking or pasteurization and prior to packaging for point of sale.

Food preservation by inhibition of growth of yeasts, molds and lactobacilli is often difficult. Unfortunately, microorganism contamination may occur following pasteurization by the processor. Acidified and native pH salad dressings, sauces, marinades, spreads, margarines and other dairy based foods and beverages in the 2.0 to 7.0 pH range are known to be susceptible to spoilage by yeast, mold, acid tolerant bacteria (e.g. Lactobacillus sp., Gluconobacter/Acetobactersp.) and/or mesophilic or thermophilic spore forming (e.g. *B. coagulans*) and non-spore forming bacteria.

Many people eat processed foods after a significant period of time has elapsed from a first cooking or pasteurization by the food manufacturer thereby permitting bacteria introduced by post-pasteurization contamination to grow. Since this food consumption may occur without reheating the processed food to sufficient temperatures for sufficient time to kill any microbes which may have been introduced subsequent to initial cooking, there is a risk of food spoilage. The present invention seeks to ameliorate the aforementioned risk.

2. Related Art

Natamycin, also known as pimaricin, is an antifungal agent produced by Streptomyces natalensis. The compound is effective against yeasts and molds and is reported to be ineffective against bacteria. It is approved for use as an additive which may be applied to the surface of cuts and slices of cheese to inhibit mold spoilage (21 CFR 172.155). This information is available from an article on "Antirmicrobials: Assuring Food Safety" by J. Giese in the June 1994 Food Technology periodical 48 (6) pp. 101–110.

Natamycin has been used in animal feeds U.S. Pat. No. 4,600,706, in sausages and sausage casings U.S. Pat. No. 4,664,861 and in mixtures with other preservatives to preserve milk U.S. Pat. No. 5,196,344.

Generally, however, the solubility of Natamycin has limited its use to the surface treatment of cheese for which it is approved by the FDA.

Natamycin has also been of interest in the treatment of food products because it is highly active against yeasts and molds, as opposed to bacteria (see Morris and Hart, "Pimaricin—What Is It?", *Culture Dairy Products Journal*, Volume 13, page 22, 1987) Reportedly, Natamycin has been applied to food products in several ways. It has been added in dry form to liquids, slurries, pastes and semisolids when adequate mixing can be accomplished, or the pure Natamycin can be mixed with one or more of the dry ingredients and then added to a given food product. Solid foods requiring surface protection can be dipped, misted, fogged or dusted with a solution or suspension of Natamycin. Additionally, it has been suggested that protection from yeast and molds may be achieved in solid food by incorporating Natamycin homogeneously into the food itself.

Natamycin has also been used to retard spoilage of dressed poultry, to protect cottage cheese, and has been widely used in the dip-treatment of cheeses to coat them with the fungicide which is absorbed slightly, and dries to form a solid, surface coating. Various other reports suggest that Natamycin is effective in the treatment of fresh berries, tomatoes, strawberries and raspberries. These reports indicate that Natamycin has an antiyeast activity when added to wines, and various fruit juices, such as apple juice or orange juice. (See, Morris and Hart, cited above.)

Nisin is a natural antimicrobial material which is a polypeptide bacteriocin produced by the lactic acid bacteria, *Streptococcus lactis*, Group N. Nisin has been used in conjunction with chelating or sequestering agents in the preservation of foodstuffs. U.S. Pat. Nos. 5,573,797; 5,573,800 and 5,573,801 all use this combination as a food preservative.

SUMMARY OF THE INVENTION

It is an object of this invention to provide a novel natural microbiocidal and/or microbiostatic composition for preserving foodstuffs.

A further object is to provide a method for preserving foodstuffs by employing a novel natural combination of microbiocidal and/or microbiostatic components in the foodstuff.

The above objects may be achieved by incorporating a novel combination of Natamycin and Nisin into foodstuffs.

It has been found that Natamycin, when introduced into foodstuffs alone in its commercial form (as "Delvocid®—a 50/50 blend with lactose) at concentrations ranging from 40–1000 ppm, to be extremely effective against yeast and mold, completely inhibiting or significantly delaying their outgrowth, but showing little if any effect against bacteria. When Natamycin is used in combination with Nisin at concentrations of about 1 to 50 ppm the two compounds are believed to work in synergy, broadening the scope of preservation to stabilize susceptible food systems against both fungi and bacteria. The stability and ostensibly the efficacy of Natamycin, reported to be sensitive to oxidation, appears to be enhanced by the presence of antioxidants and/or oxygen scavengers (such as ascorbic acid) and the like. Further, heavy metals, and divalent cations, are also reported to adversely affect the stability of Natamycin and Nisin. A preferred embodiment capitalizes on the incorporation of citric acid and/or water softening to negate this effect and sustain the efficacy of the "all-natural" system. The use of chemical chelating agents like EDTA, SHMP (sodium hexametaphosphate), and phosphoric acid may also be used to sustain system efficacy over time, where water hardness control is not absolute.

BRIEF DESCRIPTION OF THE INVENTION

Many preservatives are readily available for many diverse uses. Many foodstuffs are relatively easy to stabilize. Many foodstuffs, however, because of their delicate balance of flavors require the utmost care in selecting preservatives. A fine balance must thus be achieved in stabilizing the foodstuff without deleteriously affecting its flavor.

The method of the invention employs a preservative system including Nisin (Nisaplin) and Natamycin (pimaricin) to preserve a foodstuff such as sauces, dressings, beverages including tea containing beverages, marinades, dairy products, spreads, margarines, meats and the like.

A novel antimicrobial composition comprising a synergistic combination of Nisin a Streptococcus-derived bacteriocin and Natamycin has been discovered to have unexpectedly good antimicrobial properties. Additionally, the inventive composition surprisingly is able to prolong food shelf life by preventing food spoilage for a longer period of time than would be expected based upon the effectiveness of either component alone. Nisin is used at levels ranging from 1–50 ppm with Natamycin in the 20–500 ppm range to effect stability. The amount of both Nisin and Natamycin employed will depend on the amount of water in the foodstuff to be preserved. In a margarine containing only about 20% water 20 ppm Natamycin and 2 ppm Nisin may be as effective as 100 ppm Natamycin and 10 ppm Nisin in a dressing containing 85 to 90% water. Thus, the amount of preservative used is directly proportional to the amount of water available in the food. Thus, about 20 to 500 ppm Natamycin or more may be used and preferably about 100 to 500 ppm or more based on the water content. About 1 to about 50 ppm of Nisin may be used about 1 to 25 ppm is preferred with about 5 to 15 ppm being most preferred again based on the water content.

The preservation technology can be used to effect microbiological stability and/or safety in beverages, such as fruit and vegetable juices, tea and herbal tea beverages, juice-containing or other flavored tea beverages, soft drinks, or any other beverage distributed at ambient (or chilled temperatures) and requiring chemical preservatives, a thermal process, strict chill chain control, or other technology to prevent yeast, mold, and/or bacterial spoilage as well as the other foodstuff systems mentioned. The incorporation of the Nisin/Natamycin preservative system could achieve this while permitting an "all natural" claim, according to the current labeling convention for these agents.

The combination, in many systems, is believed to be synergistic and its effect further enhanced by the incorporation of an oxygen scavenger or antioxidant, and/or a chelating agent or through water hardness control, to sustain Natamycin and Nisin activity by preventing their degradation. Several of the preferred embodiments of the foodstuffs also include ascorbic acid, a known oxygen scavenger, which also contributes to this effect.

Heavy and divalent metals are also reported to adversely affect the stability of Nisin and Natamycin. One preferred embodiment incorporates citric acid, a natural sequestrant. This is further enhanced by the incorporation of other sequestering agents and/or by water hardness control which removes heavy metals as well as divalent metals. This negates the effect and sustains the efficacy of the Nisin/Natamycin in an "all-natural" system. Other sequestering agents such as EDTA and its organic and inorganic salts, e.g. sodium and the like, metaphosphoric acid salts, polyphosphoric acid salts, tartaric acid salts, and phosphoric acid may also be used to sustain system efficacy over time, where water hardness control is not absolute.

Further, the simple expedient of incorporating a concentration of Natamycin, 1.5 times or more in excess of its maximum solubility with Nisin, also is expected to significantly enhanced their combined effect, ostensibly by providing a "preservative" reserve buffer.

Natamycin, a fermentation by-product that is a naturally derived antimicrobial thus affords an opportunity to stabilize certain foodstuffs naturally without the use of chemical preservatives when used in combination with Nisin.

Natamycin is a creamy white, odorless, tasteless, practically insoluble crystalline amphoteric powder. It belongs to the polyene macrolide or macrocyclic lactone group of compounds. In low concentrations, Natamycin is a potent inhibitor of fungal microorganisms.

Natamycin is relatively stable when in a dry state or when mixed with dry diluents. However, the molecules activity is sensitive to ultraviolet light, oxygen, or extreme pH values. It is relatively insoluble in water in which its solubility is of the order 0.005–0.010 weight/weight percent. Additionally, even in solution, Natamycin is rather unstable. Aqueous solutions of 16 mog/ml of Natamycin became microbiologically inactive after 24 hour exposure to light. Inactivation of Natamycin by light, peroxides or oxygen proceeds at the fastest rate in solution or suspension. Natamycin is also sensitive to heavy metals, and it may lose up to 75% of its effectivity in 4–5 hours in their presence.

Natamycin is also referred to by other names, e.g. Pimaricin, antibiotic A 5283, tennecetin, CL 12625, Mycrophyt, Myprozine, Natacyn and Pimafucin. Naturally, the present invention extends to compositions employing Natamycin under any of its alternative names or designations. The antibiotic is currently available from a number of companies under various trademarks, e.g. from Gist-Brocades Food Ingredients, Inc. of King of Prussia, Pa. under the trademark DELVOCID®. Further details of the antibiotic can be found in The Merck Index, Tenth Edition, 1983, published by Merck & Co., Inc., entry no. 6278, page 922.

Nisin is a polypeptide bacteriocin produced by the lactic acid bacteria, *Streptococcus lactis* Group N.

Nisin is reportedly a collective name representing several closely related substances which have been designated A, B, C, D and E Nisins having a similar amino acid composition.

The structure and properties of Nisin are further discussed in the article by E. Lipinska, entitled "Nisin and Its Applications", *The 25th Proceedings of the Easter School in Agriculture Science at the University of Nottingham*, 1976, pp. 103–130 (1977), which article is hereby incorporated by reference. The World Health Organization Committee on Biological Standardization has established an international reference preparation of Nisin, and the international unit (IU hereinafter) is defined as 0.001 mg of this preparation. NISAPLIN is the brand name for a Nisin concentrate containing 1 million IU per gram which is commercially available from Aplin & Barreft Ltd., Trowbridge, Wiltshire, England.

Nisin is a known food preservative which is also known to be heat-stable; acid-stable and active against gram-positive bacteria. Nisin is used as a food preservative in dairy products and vegetables usually in conjunction with heat treatment. Nisin also occurs naturally in raw milk and has been used in heat processing of meat pastes. Nisin is considered to be nontoxic with toxicological data indicating no adverse effect at levels of 3.3 million IU per Kg of body weight. Nisin reportedly can stand heating to 121° C. without loss of activity. Although some loss of activity may be expected when used with processed foods, this may be ameliorated e.g. by increasing the amount of Nisin applied. Effective levels of Nisin to preserve foodstuffs reportedly range from 25–500 IU/g or more.

The addition of about 20 to 500 ppm of Natamycin and about 1 to 50 ppm Nisin to foodstuffs is expected to reduce or completely eliminate mold, yeast and bacterial outgrowth in the foodstuff in the time frame required for commercial sale. This time frame varies considerably with the type of food, the distribution and sale conditions (e.g. chilled vs. ambient) and the like.

The advantage of using the Natamycin and Nisin is that it allows the reduction or elimination of chemical preservatives thereby making a microbiologically stable product which is also typically more organoleptically acceptable than those containing higher levels of chemical preservatives.

All parts and proportions herein and in the appended claims are by weight unless otherwise indicated.

A series of tests using Natamycin and Nisin were run on an italian dressing formulation. The dressing formulation was generally as follows:

| Components | % |
| --- | --- |
| Part 1 | |
| Water | 70. |
| Vinegar | 7. |
| Sodium Chloride | 2. |
| Sweetener | 4. |
| Gum | 0.4 |
| Flavors | 0.9 |
| Part 2 | |
| Vegetable Oil | 5.3 |
| Natamycin | varies |
| Nisin | varies |
| Part 3 | |
| Water | 4.3 |
| Vinegar | 4.27 |
| Gum | .03 |
| Spices and Flavors | 1.80 |

Parts 1 and 2 are mixed and homogenized. Part 3 is then added and thoroughly mixed to form a homogenous mixture.

EXAMPLE 1

(Natamycin Alone)

400 ppm of Delvocid® was added to the dressing formula (200 ppm Natamycin). Samples of the dressing were then inoculated with yeast organisms and with Lactobacillus organisms. The yeast organisms were several species of *Z bailii* and *S. cerevisiae* and *Z. rouxii* obtained from spoiled dressings. The Lactobacillus was a combination of

*Lactobacillus brevis*;

*Lactobacillus buchneri*;

*Lactobacillus plantarum*; and

*Lactobacillus fermentum*.

The inoculation level was High, 10,000 to 100,000 organisms per milliliter, and Low, 100 to 1,000 organisms per milliliter. The effect of Natamycin was observed over a period of time and reported in Table 1. A control was run on the dressing alone without any preservative. This is reported in Table 2.

TABLE 1

| | ITALIAN DRESSING WITH 200 ppm Natamycin | | | | | |
| --- | --- | --- | --- | --- | --- | --- |
| ASSAY WEEK | YEAST HIGH | YEAST LOW A | YEAST LOW B | LACTIC HIGH | LACTIC LOW A | LACTIC LOW B |
| 0 | 13,000 | <10 | <10 | 44,000 | 440 | 400 |
| 1 | 10 | <10 | NT | 45,000 | 320 | NT |
| 2 | <10 | <10 | NT | >300,000 | 3,000 | NT |
| 3 | <10 | <10 | NT | TNTC | 3,000 | NT |
| 4 | <10 | <10 | NT | TNTC gassing | TNTC gassing | NT |
| 6 | <10 | <10 | NT | * | * | * |
| 8 | <10 | NT | <10 | | | |
| 10 | <10 | NT | <10 | | | |
| 12 | <10 | NT | <10 | | | |
| 16 | <10 | NT | <10 | | | |

TNTC - Too Numerous To Count – over $3 \times 10^6$
NT - Not Tested
* - Terminated

TABLE 2

| | ITALIAN DRESSING WITH NO PRESERVATIVE | | | | | |
| --- | --- | --- | --- | --- | --- | --- |
| ASSAY WEEK | YEAST HIGH | YEAST LOW A | YEAST LOW B | LACTIC HIGH | LACTIC LOW A | LACTIC LOW B |
| 0 | 21,000 | 370 | 260 | 36,000 | 350 | 500 |
| 1 | gassing | gassing | NT | 100,000 | 400 | NT |
| 2 | * | * | * | TNTC | >30,000 | NT |
| 3 | | | | * | * | * |

TNTC - Too Numerous To Count – over $3 \times 10^6$
gassing - equivalent to TNTC
NT - Not Tested
* - Terminated

EXAMPLE 2

200 ppm Nisaplin (5 ppm Nisin) and 50 ppm Delvocid (25 ppm Natamycin) were the dressing formulation. Samples of the dressing were inoculated with yeast and lactobacilli as in Example 1 and the effect observed and reported in Table 3.

The amount of Nisin was increased to 10 ppm while the amount of Natamycin at 25 ppm and samples of dressing were inoculated and the effect observed and reported in Table 4.

TABLE 3

25 ppm Natamycin 5 ppm Nisin

| ASSAY WEEK | YEAST HIGH | YEAST LOW A | YEAST LOW B | LACTIC HIGH | LACTIC LOW A | LACTIC LOW B |
|---|---|---|---|---|---|---|
| 0 | 3,000 | <10 | 100 | 14,000 | 150 | 180 |
| 1 | 1,000 | 30 | NT | 300 | <10 | NT |
| 2 | 4,300 | 20 | NT | <10 | <10 | NT |
| 3 | 30,200 | >3,000 | NT | <10 | <10 | NT |
| 4 | gassing | 770,000 | NT | 210 | <10 | NT |
| 6 | * | * | * | >3,000 | <10 | NT |
| 8 | | | | TNTC | NT | <10 |
| 10 | | | | TNTC | NT | <10 |
| 12 | | | | TNTC | NT | 780 |

TNTC - Too Numerous To Count (over 3 × 10⁶)
NT - Not Tested
* - Terminated

TABLE 4

25 ppm Natamycin 10 ppm Nisin

| ASSAY WEEK | YEAST HIGH | YEAST LOW A | YEAST LOW B | LACTIC HIGH | LACTIC LOW A | LACTIC LOW B |
|---|---|---|---|---|---|---|
| 0 | 2,400 | 30 | 30 | 2,400 | 70 | 90 |
| 1 | 1,400 | 10 | NT | 70 | <10 | NT |
| 2 | 870 | 260 | NT | <10 | <10 | NT |
| 3 | 26,700 | 3,220 | NT | <10 | <10 | NT |
| 4 | gassing | 480,000 | NT | <10 | <10 | NT |
| 6 | * | * | * | <10 | <10 | NT |
| 8 | | | | <10 | NT | <10 |
| 10 | | | | <10 | NT | <10 |
| 12 | | | | <10 | NT | <10 |
| 14 | | | | <10 | NT | <10 |

From the results it is clear that 10 ppm Nisin prevented lactobacilli growth and 200 ppm Natamycin prevented yeast growth. It is expected that as little as 10 ppm Nisin will be effective to prevent lactobacilli growth in an appropriate medium.

Although the invention has been described in detail with respect to preferred embodiments thereof, variations and modifications will be readily apparent to those skilled in the art without departing from the spirit and scope of the inventions as set forth in the claims.

What is claimed is:

1. A foodstuff having a pH of about 2.0 to 7.0 and containing Natamycin in combination with Nisin in an amount sufficient to inhibit outgrowth of yeast or mold and bacteria wherein the Natamycin in said Nisin/Natamycin combination is present in an amount of 1.5 times or more of the maximum solubility of said combination in the foodstuff.

2. A foodstuff as defined in claim 1 wherein said food material is selected from the group consisting of dressings, sauces, marinades, dairy foods, spreads, margarine, meats and beverages.

3. A foodstuff as defined in claim 1 wherein said Natamycin is present in an amount of at least about 20 to 500 ppm and said Nisin is present in an amount of about 1 to 50 ppm based on the water content of the foodstuff.

4. A foodstuff as defined in claim 1 having sufficient Natamycin and Nisin to completely inhibit outgrowth of yeast or mold and bacteria.

5. A foodstuff as defined in claim 1 containing a sufficient amount of Natamycin and Nisin to destroy or inhibit the growth of pathogenic microbes.

6. A foodstuff as defined in claim 1 further comprising tea solids in an amount sufficient to result in an antioxidant effect.

7. A foodstuff as defined in claim 1 further comprising an antioxidant or oxygen scavenger.

8. A foodstuff as defined in claim 1 wherein a sequestrant is present in an amount sufficient to reduce the effect of solubilized metals on the Natamycin/Nisin combination.

9. A foodstuff as defined in claim 1 wherein the water used to prepare the foodstuff is treated to reduce the water hardness to a level of 120 ppm or less measured as calcium carbonate.

10. A foodstuff as defined in claim 8 wherein said foodstuff is an aqueous based beverage comprising about 0.01% to 0.5% tea solids by weight said beverage having a pH of about 2.5 to 6.5.

11. A foodstuff as defined in claim 8 wherein said foodstuff is a liquid foodstuff including an aqueous tea infusion having 0.06 to 0.2% tea solids and having a pH of 2.5 to 6.5.

12. A foodstuff as defined in claim 1 comprising a dressing having from 0% to about 60% fat and having a pH of about 2.5 to 4.5.

13. A foodstuff as defined in claim 1 comprising a spread having from 0% to about 80% fat.

14. A foodstuff having a pH of about 2.0 to 7.0 and containing a sufficient amount of Natamycin in combination with Nisin to prevent microbial spoilage, wherein the Natamycin is present in an amount of at least about 20 to 500 ppm and said Nisin is present in an amount of about 1 to 50 ppm based on the water content of the foodstuff.

15. A foodstuff as defined in claim 14 wherein said food material is selected from the group consisting of dressings, sauces, marinades, dairy foods, spreads, margarine, meats and beverages.

16. A foodstuff as defined in claim 14 having sufficient Natamycin and Nisin to completely inhibit outgrowth of at least one of yeast, mold and bacteria.

17. A foodstuff as defined in claim 14 containing a sufficient amount of Natamycin and Nisin to destroy or inhibit the growth of pathogenic microbes.

18. A foodstuff as defined in claim 14 further comprising sufficient tea solids to result in a significant antioxidant effect.

19. A foodstuff as defined in claim 14 further comprising, at least one of an antioxidant and oxygen scavenger.

20. A foodstuff as defined in claim 14 wherein a sequestrant is present in an amount sufficient to reduce the effect of solubilized metals on the Natamycin/Nisin combination.

21. A foodstuff as defined in claim 14 wherein the water used to prepare the foodstuff is treated to reduce the wear hardness to a level of 120 ppm or less measured as calcium carbonate.

22. A foodstuff as defined in claim 14 wherein said foodstuff is an aqueous based beverage comprising about 0.01% to 0.5% tea solids by weight, said beverage having a pH of about 2.5 to 6.5.

23. A foodstuff as defined in claim 14 wherein said foodstuff is a liquid foodstuff including an aqueous tea infusion having 0.06 to 0.2% tea solids and having a pH of 2.5 to 6.5.

24. A foodstuff as defined in claim 14 comprising a dressing having from 0% to about 60% fat and having a pH of about 2.5 to 4.5.

25. A foodstuff as defined in claim 14 comprising a dressing having 0% to about 60% fat and having a pH of about 2.5 to 4.5.

26. A foodstuff as defined in claim 14 comprising a spread having from 0% to about 80% fat.

* * * * *